United States Patent
Wobben

(10) Patent No.: US 9,303,625 B2
(45) Date of Patent: Apr. 5, 2016

(54) OPERATING METHOD FOR A WIND PARK

(71) Applicant: Aloys Wobben, Aurich (DE)

(72) Inventor: Aloys Wobben, Aurich (DE)

(*) Notice: Subject to any disclaimer, the term of this patent is extended or adjusted under 35 U.S.C. 154(b) by 0 days.

(21) Appl. No.: 14/510,811

(22) Filed: Oct. 9, 2014

(65) Prior Publication Data

US 2015/0028593 A1    Jan. 29, 2015

Related U.S. Application Data

(63) Continuation of application No. 13/339,965, filed on Dec. 29, 2011, now Pat. No. 8,880,230, which is a continuation of application No. 10/555,609, filed as application No. PCT/EP2004/004118 on , now Pat. No. 8108079.

(30) Foreign Application Priority Data

May 5, 2003  (DE) .................................. 103 20 087
Jun. 26, 2003 (DE) .................................. 103 28 889

(51) Int. Cl.
| | |
|---|---|
| *F03D 7/00* | (2006.01) |
| *F03D 9/00* | (2006.01) |
| *H02J 11/00* | (2006.01) |
| *F03D 7/02* | (2006.01) |
| *F03D 7/04* | (2006.01) |

(52) U.S. Cl.
CPC ................ *F03D 7/00* (2013.01); *F03D 7/0204* (2013.01); *F03D 7/026* (2013.01); *F03D 7/028* (2013.01); *F03D 7/048* (2013.01); *F03D 9/005* (2013.01); *H02J 11/00* (2013.01); *Y02E 10/723* (2013.01); *Y02P 70/523* (2015.11)

(58) Field of Classification Search
None
See application file for complete search history.

(56) References Cited

U.S. PATENT DOCUMENTS

| | | | |
|---|---|---|---|
| 2,086,279 | A | 7/1937 | McDonald, Jr. |
| 2,159,886 | A * | 5/1939 | Cullin ............................ 290/44 |
| 5,799,484 | A | 9/1998 | Nims |
| 6,379,115 | B1 | 4/2002 | Hirai |
| 6,420,796 | B1 | 7/2002 | Lagerwey |

(Continued)

FOREIGN PATENT DOCUMENTS

| | | |
|---|---|---|
| DE | 27 42 559 B | 10/1978 |
| DE | 37 24 183 A1 | 2/1989 |

(Continued)

OTHER PUBLICATIONS

European Office Action relating to European Application No. 09152358.9, mailed Apr. 27, 2009, 6 pages.

*Primary Examiner* — Sean Shechtman
*Assistant Examiner* — Steven Garland
(74) *Attorney, Agent, or Firm* — Seed IP Law Group PLLC

(57) ABSTRACT

The present invention concerns a method of operating a wind park having a plurality of wind power installations. A wind power installation includes an electrical energy storage means associated with the wind power installation to store electrical energy which is consumed for starting up the wind power installation after stoppage and consumed for emergency shutdown of the wind power installation. In some embodiments, the wind power installation includes a control system to control taking of energy from the electrical energy storage means for an emergency shutdown procedure such that a sufficient emergency shutdown reserve is maintained in the electrical energy storage means to start a first wind power installation without consuming energy from a network.

15 Claims, 2 Drawing Sheets

(56) References Cited

U.S. PATENT DOCUMENTS

| | | |
|---|---|---|
| 6,906,431 B2 | 6/2005 | Wobben |
| 6,924,627 B1 | 8/2005 | Wobben |
| 7,256,508 B2 | 8/2007 | Altemark et al. |
| 7,355,294 B2 | 4/2008 | Teichmann |
| 8,108,079 B2 | 1/2012 | Wobben |
| 2002/0192070 A1 | 12/2002 | Selsam |
| 2003/0227172 A1 | 12/2003 | Erdman et al. |
| 2004/0100229 A1 | 5/2004 | Wobben |
| 2005/0116476 A1 | 6/2005 | Feddersen |

FOREIGN PATENT DOCUMENTS

| | | |
|---|---|---|
| DE | 196 51 364 A1 | 6/1998 |
| DE | 197 56 777 A1 | 7/1999 |
| DE | 199 48 196 A1 | 5/2001 |
| DE | 100 22 974 A1 | 11/2001 |
| DE | 100 33 029 A1 | 1/2002 |
| DE | 101 38 399 A1 | 2/2003 |
| GB | 717100 | 10/1954 |
| GB | 740090 | 11/1955 |
| JP | 9/60575 A | 3/1997 |
| JP | 10-159706 A | 6/1998 |
| JP | 2000-64940 A | 3/2000 |
| JP | 2001-107838 A | 4/2001 |
| JP | 2002-315395 A | 10/2002 |
| JP | 2003-214320 A | 7/2003 |
| RU | 2 132 483 C1 | 6/1999 |
| WO | 02/05406 A1 | 1/2002 |
| WO | 03/030329 A1 | 4/2003 |

\* cited by examiner

OPERATING METHOD FOR A WIND PARK

CROSS-REFERENCE TO RELATED APPLICATION

This application is a continuation of U.S. patent application Ser. No. 13/339,965, filed Dec. 29, 2011, now pending, which is a continuation of U.S. patent application Ser. No. 10/555,609, filed Jan. 19, 2007, now issued U.S. Pat. No. 8,108,079, which is the National Stage of International Application No. PCT/EP2004/004118, filed Apr. 19, 2004; all applications are incorporated herein by reference in their entirety.

TECHNICAL FIELD

The present invention concerns a method of operating a wind park having a plurality of wind power installations. The invention further concerns a wind power installation having an electrically excited generator and a wind park having a central apparatus for controlling the park.

The term 'wind park' is used here in the sense of a plurality of wind power installations which are connected to a common network connecting point, irrespective of the spatial arrangement of the individual wind power installations relative to each other. That is to say, even a plurality of groups of wind power installations, with the groups spatially separated from each other, are conceived as being a wind park if they are connected to a network connecting point for example by way of a common transformer plant.

BACKGROUND INFORMATION

Wind parks have been known in the state of the art for some time. In such wind parks the kinetic energy of the wind is converted into electrical energy to a greater extent than is possible in the case of individual installations. It will be appreciated however that a prerequisite in that respect is that sufficient wind is blowing.

As however the wind does not blow without interruption, the windless time can be used to carry out operational procedures such as untwisting cables or the like. As however the wind power installations do not produce any electrical energy during windless times, they take the energy required for carrying out the operational procedures from the network. It will be noted however that there are limit values, agreed with the network operator, for drawing energy from the network. In that respect the energy taken from the network is already comparatively expensive, although the proportion which exceeds the agreed maximum limit is billed at an even higher rate by the network operator. Accordingly the wind park operator incurs additional costs which reduce the returns from the wind park, in dependence on the amount of energy taken from the network.

BRIEF SUMMARY OF THE INVENTION

Therefore, the object of the present invention is to provide a method of operating a wind park having a plurality of wind power installations, a wind power installation having an electrically excited generator and a wind park having a central apparatus for control of the park, wherein the execution of operational procedures is effected with a restricted or reduced power draw from the network (reference power).

In the case of a wind park of the kind set forth in the opening part of this specification, that object is attained in that operational procedures of at least one wind power installation are controlled in such a way that electrical power is taken from the network only up to a predeterminable maximum value. Suitably limiting the power taken from the network (reference power) provides that the reference power does not exceed at least the agreed maximum value. In that way, it is possible to avoid at least the markedly higher level of costs for the power which exceeds the maximum value.

In a preferred embodiment of the invention, the operational procedures of the wind power installations are carried out in at least two groups displaced by a respective predeterminable period of time. This grouping provides that the situation is always such that only so many wind power installations take power from the network that the power taken is as low as possible or at least does not exceed the agreed maximum value.

In a particularly preferred development of the method, the first group is formed by one wind power installation. That is particularly advantageous if the operational procedure is starting up the wind park, that is to say after wind blows up again. Instead of taking from the network the electrical energy required for all installations of the wind park for azimuth adjustment, blade angle adjustment, installation control and generator excitation, that is done only for one group and that group preferably comprises only one wind power installation. Consequently, that required energy is also taken from the network only for one wind power installation.

As soon as that one wind power installation is itself producing electrical energy, that energy is used to start up further installations which then in turn produce electrical energy which is then again used for starting up further installations. That time-staggered procedure means that, for starting up a wind park, only the power required for starting the first installation has to be taken from the network while the other installations of the wind park can then be started with the power which is already being produced in the park. In that way, the power produced in the wind park can admittedly not be delivered into the network, but in return there is no need for expensive power to be drawn from the network.

In accordance with a preferred development of the method according to the invention, the power used for the operational procedures is limited to a predeterminable proportion of the power produced in the wind park. In that way on the one hand the wind park can be started up and on the other hand electrical power is available, which can be delivered into the network. Accordingly a weak network can also already be supported while a wind park is starting up, instead of still taking power from the network for starting up the wind park.

In a particularly preferred feature, the method is such that the wind power installations with the lowest energy requirement for a predetermined operational procedure preferably execute same. Here, a distinction is to be drawn according to the respective operational procedure to be executed. If the operational procedure to be carried out is for example the operation of untwisting cables, that procedure, in this preferred embodiment, is firstly carried out by the wind power installations at which the least amount of twisting has occurred. Those installations can correspondingly quickly carry out the procedure and are then available again for producing electrical energy. Likewise wind direction tracking adjustment is preferably first performed in relation to the installations at which the smallest yaw angle has occurred.

Different aspects can be taken into consideration in the operational procedure of starting up wind power installations. One aspect is for example that the respective installations which are furthest to the windward side, that is to say in the direction of the wind, are started up first as they are not screened by other installations and therefore can take the greatest amount of energy from the wind. Another aspect concerns the highest power yield at a predetermined wind speed. Here therefore consideration can be given to the power characteristic of a wind power installation so that the maximum possible amount of electrical power can be produced with the available wind supply. It will be appreciated that combinations of such features are also possible, for example taking account of the smallest yaw angle and the highest level of electrical power.

In order also to make a wind park capable of a self-contained start, it can include a permanently excited wind power installation with motor-less wind direction tracking adjustment. The capability of a self-contained start here denotes the capability of being able to start a wind park although no energy can be taken from the network, for example as a consequence of a network failure. Therefore, by means of the permanently excited wind power installation, it is firstly possible to start at least one wind power installation which then produces electrical energy in accordance with the claimed method, and that energy is then used for starting further wind power installations. In that respect electrical energy is required at any event to supply the control system of the wind power installation or installations to be started, even if the pitch angle and the azimuth position are adequate for starting the wind power installation or installations and the remanence of the generator is sufficient for excitation.

BRIEF DESCRIPTION OF THE SEVERAL VIEWS OF THE DRAWINGS

An embodiment of the invention is described in greater detail hereinafter with reference to the figures in which.

DETAILED DESCRIPTION

Embodiments of techniques for operating a wind park are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
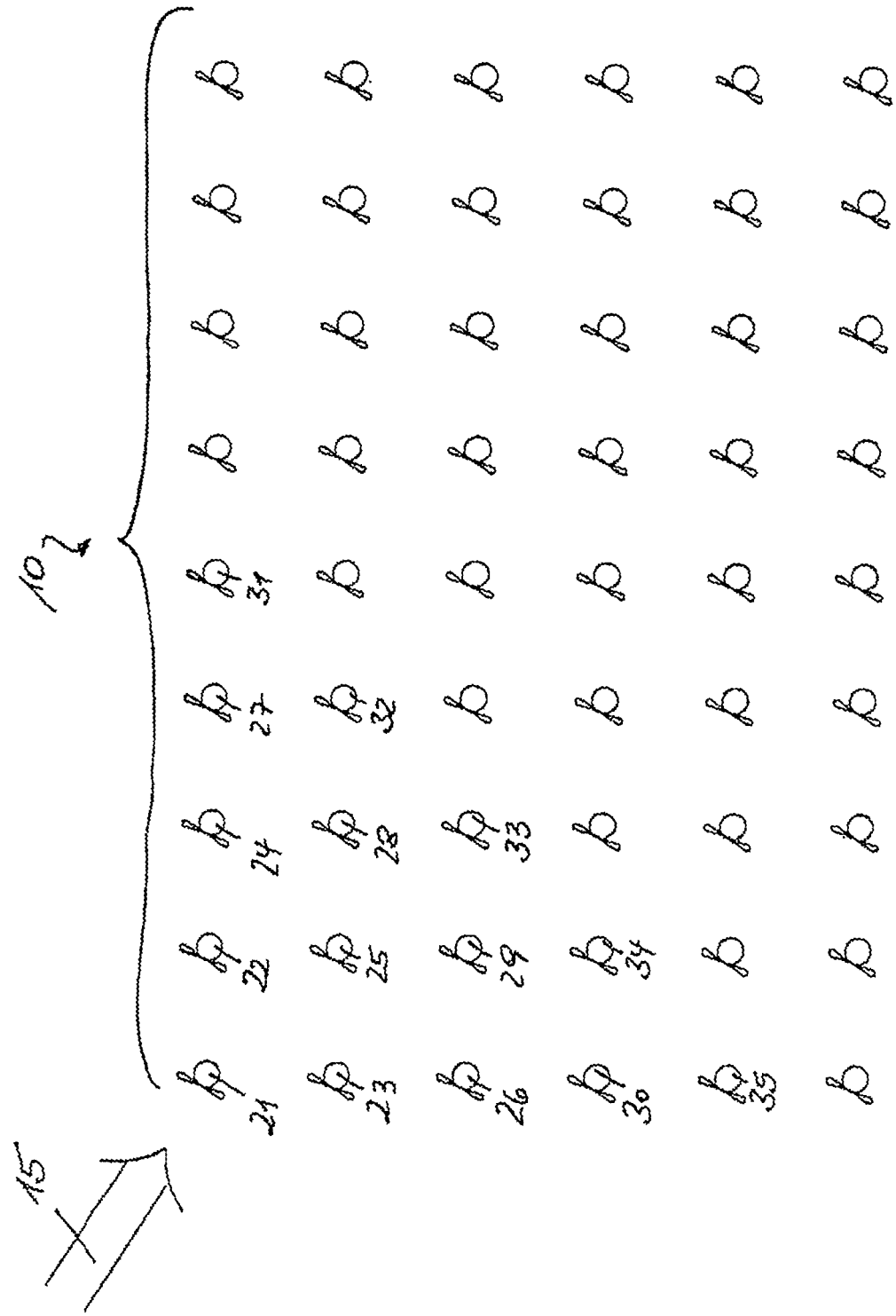
FIG. 1 shows a wind park for describing the method according to the invention.

Referring to FIG. 1, shown therein is a wind park 10 having a plurality of wind power installations. Some of those wind power installations are identified by references 21-35. In addition the wind direction 15 is marked by an arrow in this FIG. 1. Reference will be made to this FIG. 1 to explain the operation of starting the wind park, in accordance with the method of the invention.

The wind power installation which is furthest to the windward, that is to say which is in the direction of the wind, is the installation 21. That installation can therefore certainly take the maximum amount of energy from the wind. Therefore, initially only that wind power installation 21 is started using power taken from the network, for azimuth adjustment, rotor blade adjustment, generator excitation, installation control and the like. In that respect, the power draw can be assumed to be about 5 kW, in which respect it will be appreciated that that value is also dependent on the type of installation.

If a wind speed of about 6 m/s is taken as a basis for consideration, then for example a power of 80 kW can be assumed to apply. As that power is the power delivered by the wind power installation, its own consumption is already taken into account. Therefore, the power delivered by that one wind power installation can be used to start up a further 16 wind power installations, and so forth. It will be very clear here that, in spite of the time-staggered starting procedure, the entire wind park can come into operation quite quickly. Therefore, in comparison with a relatively slight loss due to the 'delayed' start-up of a plurality of wind power installations, there is a high saving in terms of reference power which does not have to be paid for.

Figure 2:
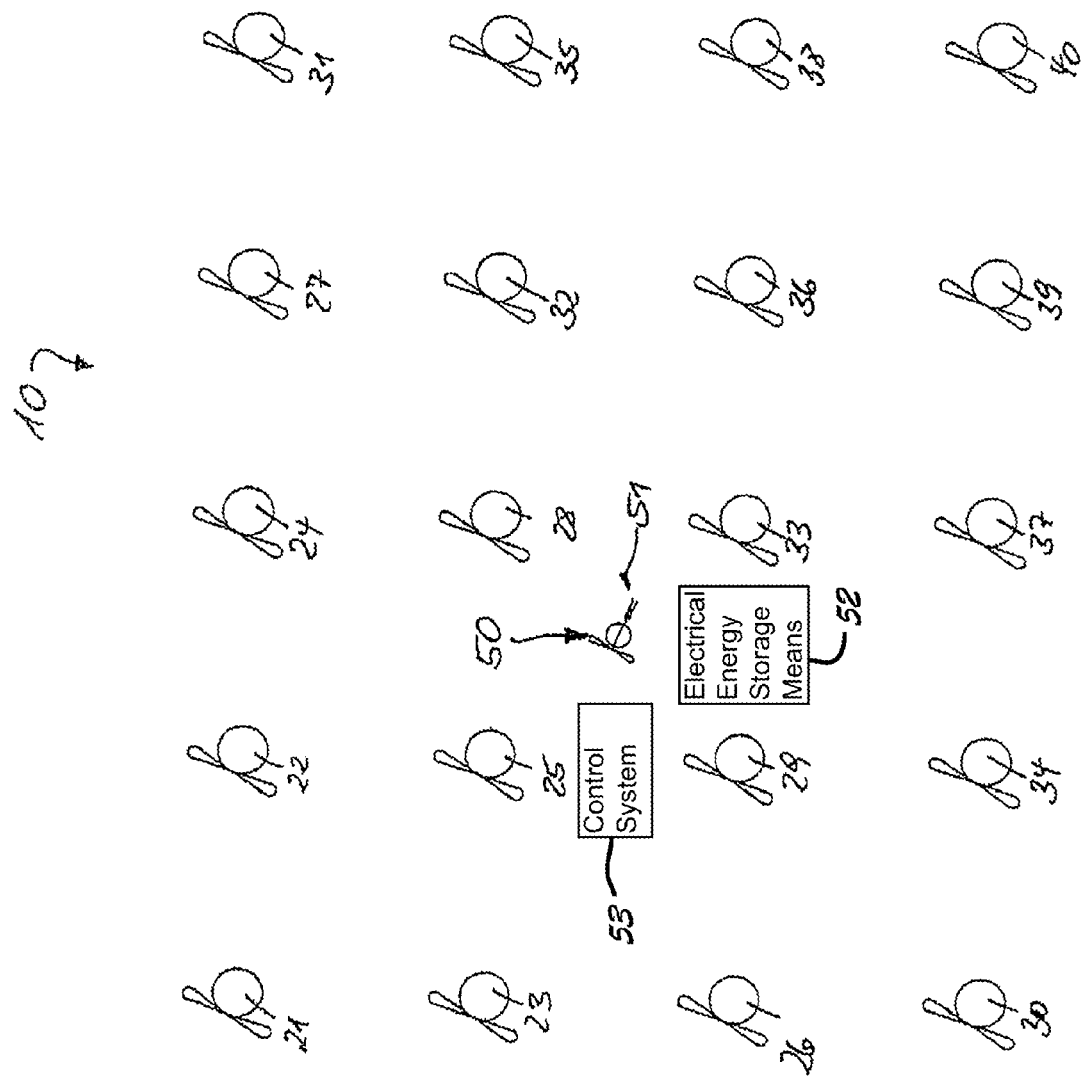
FIG. 2 shows a wind park according to the invention.

FIG. 2 also shows a wind park 10 with a plurality of wind power installations 28-40. Disposed within that wind park 10 there is also a permanently excited wind power installation with motor-less wind tracking adjustment 50. The motor-less wind tracking adjustment is illustrated in this respect by a wind vane 51. Therefore, when wind gets up, that wind power installation 50 is automatically oriented in the direction of the wind by the wind vane 51 and begins to produce electrical energy as the generator is permanently excited, therefore does not need any exciter current.

As such permanently excited wind power installations are definitely known in the state of the art, such an installation will not be described in detail here. A wind power installation of type ENERCON E-12 is adopted for this embodiment, which can produce a power of 30 kW and, at the above-assumed wind speed of about 6 m/s, produces about 6 kW, that is to say sufficient power to start up at least one further wind power installation in the wind park. In that respect, a per se known suitable emergency power supply can be available for a power supply to the installation control system 53, which is required as a minimum.

In accordance with the above example therefore, with a power draw for starting a wind power installation of about 5 kW, a wind power installation 21 can be started. Then, with 80 kW, the wind power installation 21 would provide sufficient power to start a further 16 wind power installations of the wind park. In that way, 17 out of 20 wind power installations of the wind park 10 are then in operation within a short time. In that situation however no electrical energy from the network has been used and consequently also no costs have been incurred in that respect or the wind park can be started in spite of a network failure and can now feed power into the network.

As, in the case of a network failure, a so-called blacked-out network, firstly frequency and voltage have to be built up again, a master machine is naturally essential, which takes over that function for example with a self-commutated inverter. The (other) wind power installations can then be synchronized with respect to the network and can begin to feed in power. Depending on the respective requirement involved, that power which is fed into the network can be reactive power and/or active power.

Insofar as the way in which a given wind park can be started with the minimum possible supply of energy from the network has been described hereinbefore, a corresponding concept will now also be described for a single wind power installation.

If a wind power installation is stopped because of a lack of wind or because the installation was stopped for example for service operations, electrical energy is required for starting up that wind power installation, at least to supply the installation control system 53 with electrical energy and/or to set the rotor blades to the optimum angle of attack (pitch) and/or to set the machine housing of the wind power installation into the wind in such a way that the rotor can be driven by the wind in the optimum fashion, and so forth.

In the case of previous wind power installations, as described, the energy necessary for starting up the wind power installation is usually taken from the network. That energy however must be taken from the network operator at quite high cost and the operator of the wind power installation has to pay a markedly higher price for that reference power, than he gets back from the operator of the network, for a corresponding feed of energy into the network.

Therefore, supplemental to the foregoing description, the object of the present invention is also to limit the need for electrical energy from the network for starting a single wind power installation in order thereby overall to reduce the costs of operating the wind power installation.

For that purpose it is proposed, in a wind power installation having an energy storage means 52 in which electrical energy is stored, to firstly use electrical energy from the energy storage means 52 for starting up the wind power installation in order thereby to move the machine carrier into the correct azimuthal position and/or to provide the generator with the necessary exciter power and/or to move the rotor blades to a desired setting angle and in order in particular to bring the installation control system 53 into operation and for that purpose supply it with electrical energy.

The energy storage means 52 used can be for example the electrical energy storage means 52 which is in any case frequently provided in wind power installations for emergency shutdown of the wind power installations, for example an electrical energy storage means 52 for providing the energy for fixing the rotor blades in an emergency shutdown. In that respect it is necessary to ensure that a sufficient amount of energy for an emergency shutdown is maintained in the energy storage means 52.

Preferably, when starting up the wind power installation, for adjustment of the machine housing, the rotor blades are so adjusted in terms of their setting angle that the rotor is driven and then the generator is supplied with exciter energy so that the wind power installation is capable of producing electrical energy with the generator.

It is also possible for the electrical energy produced by the generator to be used alone or together with the energy still present in the electrical energy storage means 52, having regard to the emergency shutdown reserve, to move the machine carrier into the desired azimuthal position.

When moving the machine carrier it is preferred if in that situation the rotor rotates and moves the rotor blades into a position which does not or scarcely brakes a rotary movement of the rotor.

As the cables at the transition between the pod and the pylon of the wind power installation also have to be untwisted from time to time (because the pod has rotated about its axis of rotation a plurality of times in the same direction) and the untwisting operation is regularly carried out when the installation is stationary and, in that situation, for performing the untwisting operation, the necessary energy for untwisting the cables, that is to say for azimuthal rotation of 360° and more, must in turn be taken as energy from the network, it is also proposed that the untwisting operation is effected when the wind speed is greater than the start-up speed but preferably less than the nominal speed. Under such conditions the necessary energy for cable untwisting can then be provided precisely in a wind park comprising individual wind power installations which then supply their power directly to the installation where cable untwisting has to be effected so that the no energy has to be taken from the network for the untwisting operation.

If for example the wind speed is about 5 m/s, the energy yield is in any case not very great but it is usually sufficient to provide the necessary energy for rotating the machine housing.

In wind power installations from Enercon, for example wind power installations of type E-40 or E-66, electrical charge storage devices are provided for each rotor blade, for the emergency shutdown procedure, which are of the Ultracap type (from Epcos) and with which a relatively large amount of energy can be stored, which is usually sufficient to cause not only a one-off emergency shutdown and thus displacement of the rotor blades into the feathered position, but it can also provide sufficiently more energy in order in that way also to provide energy for other installation components such as for example the installation control system 53, azimuth adjustment means and the like.

If the wind power installations or the wind park are equipped with a separate energy storage means 52 such as for example a battery, the energy from that battery can also be used to start up an installation or to provide the energy necessary therefor, at the beginning.

It is also possible to provide a single wind power installation with a small wind wheel or impeller which, upon starting up the wind power installation, can provide the necessary energy totally or in part, insofar as the electrical energy can be sufficiently made available by another energy storage means 52.

If the installation-inherent energy reserves should not be sufficient for the start-up procedure, they are initially used so that it is only then that electrical energy is taken from the network and the energy taken from the network is thus overall minimized.

Finally, during normal operation of the wind power installation, the energy drawn from the energy storage means 52 can be supplied again from the energy sources which are produced by the wind power installations themselves.

Insofar as reference is also made to an energy storage means 52 in the present application, that can also be a specific generator within the wind park, for example a diesel generator, that is to say a generator capable of providing electrical energy which does not have to be taken from the network in order to start an individual wind power installation or a plurality thereof.

If a wind power installation is provided with a small wind wheel or turbine, for example such a wind wheel which provides a power of about 250 watts to 3 kW (such wind wheels can be mounted virtually anywhere, for example pylon, pod and so forth, on a wind power installation) it is also readily possible for the wind power installation to be supplied with electrical power when, due to the most widely varying causes, it is no longer at all able to draw energy from the network itself. As however wind power installations are frequently also reliant on drawing electrical energy, for example for operating danger lights (flashing light) and/or for operation of the installation components involved in regulation and control procedures, that necessary energy (also for charging up the energy storage means 52 provided) can also be produced with the small wind wheel. In addition as described that small wind wheel can also be used to provide electrical energy for starting up the wind power installation, entirely or in part.

That can also happen for example when adjusting the rotor blades, insofar as not all rotor blades are adjusted at the same time but firstly only one single rotor blade, so that the installation itself already begins to rotate then, when there is sufficient wind, so that the energy which is then produced by the wind power installation itself is also then further sufficient to adjust the other rotor blades to the desired setting angle.

A further aspect according to the invention provides that not just the energy produced by an individual wind power installation is used to set another wind power installation or a plurality of wind power installations in operation, for example to provide energy so that the correct azimuthal angle can be adopted, but if a calm period sets in, that is to say involving a low wind speed which can fall to 0, and wind power installations of a wind park are progressively shut down, that is also effected in accordance with the invention in such a way that the wind power installations of a wind park are then oriented in different directions. That can be effected on the one hand by virtue of the fact that a control system 53 is provided in the installation so that, shortly before definitive shutdown, an installation rotates into a predetermined or predeterminable direction, or that those installations which are still rotating and thus produce a small amount of electrical energy use that electrical energy to drive the azimuthal drive system of other installations so that those installations implement an orientation which differs from others.

If the calm period continues and the wind stops or the wind speeds become so low that all installations are no longer producing any electrical energy at all, then the various installations or various groups of installations involve differing orientations relative to the wind.

If now an increased wind gets up again, which blows at a speed which is above the switch-on speed, then some installations are already substantially correctly oriented in relation to the wind and can begin production straightaway without still absolutely requiring azimuth adjustment for such installations. Those installations can now preferably produce energy which is used for firstly correctly adjusting the azimuth of other installations—in the direction of the wind.

It will be appreciated that it is possible that not just each individual installation assumes a different direction, but this can also be effected in group-wise manner so that a number of given installations are directed in almost the same directions if, in the case of a calm, the wind speed falls below the switch-on speed.

At any event the above-described embodiment with the different wind direction orientation in respect of various installations when a calm occurs is advantageous because this ensures that, when the wind starts again, at least one wind power installation of the wind park can be brought into operation without requiring significant azimuth adjustment.

A variant of the above-described embodiment provides that those wind power installations which shut down first when a calm occurs assume an azimuthal orientation which is as diametral as possible in relation to the prevailing wind direction so that, if the calm continues, the wind power installations which shut down last remain in the direction from which the wind last blew.

A further variant provides that there are given preferred directions to which the installations can be oriented when a calm occurs. That preferred direction can be for example the main wind direction so that then, when the wind starts again, that is to say when the calm period comes to a conclusion, there is a relatively high probability that the wind is coming from the main wind direction and thus a very large number of wind power installations no longer have to be completely freshly adjusted, in respect of their azimuth.

A wind park management system or a suitable computer is responsible for the differing azimuth orientation of the wind power installations when a calm occurs. The wind park management system or computer includes a suitable program which provides that the varying installations assume a differing azimuthal orientation, depending on the respectively prevailing wind direction. That can be effected in such a way that it is not just any azimuthal orientation that is set, but specific preferred directions, for example the four main compass points North, East, South and West. Thus for example the Western installations of a wind park can be oriented towards the West, the Northern installations of a wind park towards the North, the Eastern installations of a wind park towards the East and the Southern installations of a wind park towards the South. It will be appreciated that intermediate positions between wind direction orientations such as North-West, South-West and so forth are also possible.

Accordingly there is an almost 100% probability that, when the wind begins to blow again at a wind speed above the switch-on speed, certain installations are directly exposed to the wind and are not in the wind shadow of any other installation. In that way reinstatement of all other installations is also speeded up.

Not just the azimuthal drive means needs to be used for azimuthal adjustment, but that can also be effected by individual rotor blades of an installation being adjusted asynchronously with the others. If for example 2 out of 3 rotor blades are in the feathered position and one rotor blade is oriented to the maximum extent across the wind, the azimuth can also be adjusted by skilled adjustment of that rotor blade, depending on precisely where it is respectively disposed, for example in the 9 o'clock position or the 3 o'clock position, without operation of the azimuthal drive arrangements being required for that purpose or same assisting with appropriate azimuthal adjustment so that the maximum electrical energy is not necessary for the adjustment procedure.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A wind power installation, comprising:
   an electrical energy storage means associated with the wind power installation storing electrical energy which is consumed for starting up the wind power installation after stoppage and consumed for a controlled shutdown of the wind power installation and controlled shutdown of a second wind power installation; and
   a control system to control energy consumed during controlled shutdown of the wind power installation such that a sufficient shutdown reserve is maintained in the electrical energy storage means for starting up the wind power installation, said control system rotating the wind power installation into a first azimuth orientation different from a second azimuth orientation of the second wind power installation during controlled shutdown.

2. A wind power installation according to claim 1 wherein the electrical energy storage means is a battery, accumulator, or capacitor.

3. A wind power installation according to claim 1 wherein control of the first azimuth orientation includes rotation of the wind power installation into a predetermined direction based on a prediction of future wind direction when a calm period comes to a conclusion.

4. A wind power installation according to claim 3 wherein the prediction of future wind direction is based on a location of the wind power installation within a wind park relative to other wind power installations within the wind park.

5. A wind power installation according to claim 4 wherein the prediction of future wind direction based on the location of the wind power installation within the wind park is associated with a main compass point (North, East, South, or West) or a pair of compass points.

6. A method to control a wind power installation, comprising:
   storing electrical energy in an electrical energy storage means associated with the wind power installation;
   consuming electrical energy from the electrical energy storage means to start up the wind power installation after stoppage;
   providing electrical energy produced by the wind power installation to rotate a second wind power installation that is not producing electrical energy, the rotation placing the second wind power installation into a second determined azimuth orientation;
   rotating the wind power installation into a determined azimuth orientation during a controlled shutdown procedure, wherein the azimuth orientation of the wind power installation during the controlled shutdown procedure is opposite to the second determined azimuth orientation; and
   controlling consumption of the electrical energy from the electrical energy storage means during the controlled shutdown procedure such that a sufficient electrical energy reserve is maintained in the electrical energy storage means to start up the wind power installation after stoppage.

7. A method to control a wind power installation according to claim 6 wherein storing the electrical energy in the electrical energy storage means includes storing electrical energy in a battery, an accumulator, or a capacitor.

8. A method to control a wind power installation according to claim 6 wherein rotating the wind power installation into the determined azimuth orientation includes rotating the wind power installation based on a prediction of future wind direction when a calm period comes to a conclusion.

9. A method to control a wind power installation according to claim 8 wherein the prediction of future wind direction is based on a location of the wind power installation within a wind park relative to at least one other wind power installation located within the wind park.

10. A method to control a wind power installation according to claim 8 wherein the azimuth orientation of the wind power installation and the second determined azimuth orientation are based on a determined main wind direction.

11. A control system for a wind park having a plurality of wind power installations, comprising:
    an electrical energy storage means associated with the wind park to store electrical energy which is consumed for starting up a stopped wind power installation and consumed for a controlled shutdown of a wind power installation to be stopped; and
    a control system to control energy consumed during the controlled shutdown of the wind power installation to be stopped such that a sufficient electrical energy reserve is maintained in the electrical energy storage means to start up the stopped wind power installation, said control system controlling a first azimuth orientation of the wind power installation to be stopped during the controlled shutdown, wherein a first azimuth orientation of a first wind installation of the wind park is different from to a second azimuth orientation of a second wind installation of the wind park during the controlled shutdown.

12. A control system for a wind park having a plurality of wind power installations according to claim 11 wherein a first azimuth orientation of a first wind installation of the wind park is same as a third azimuth orientation of a third wind installation of the wind park during the controlled shutdown.

13. A control system for a wind park having a plurality of wind power installations according to claim 11 wherein the azimuth orientation of the wind power installation to be stopped during the controlled shutdown is based on a prediction of future wind direction when a calm period comes to a conclusion.

14. A control system for a wind park having a plurality of wind power installations according to claim 11 wherein the azimuth orientation of the wind power installation to be stopped during the controlled shutdown is based on a wind direction that occurred after a past calm period came to a conclusion.

15. A control system for a wind park having a plurality of wind power installations according to claim 11 wherein the azimuth orientation of each wind power installation to be stopped is determined based on a location of the wind power installation within the wind park relative to other wind power installations within the wind park.

* * * * *